March 23, 1926.
E. A. RUSSELL
FLEXIBLE JOINT
Original Filed May 17, 1923
1,577,760
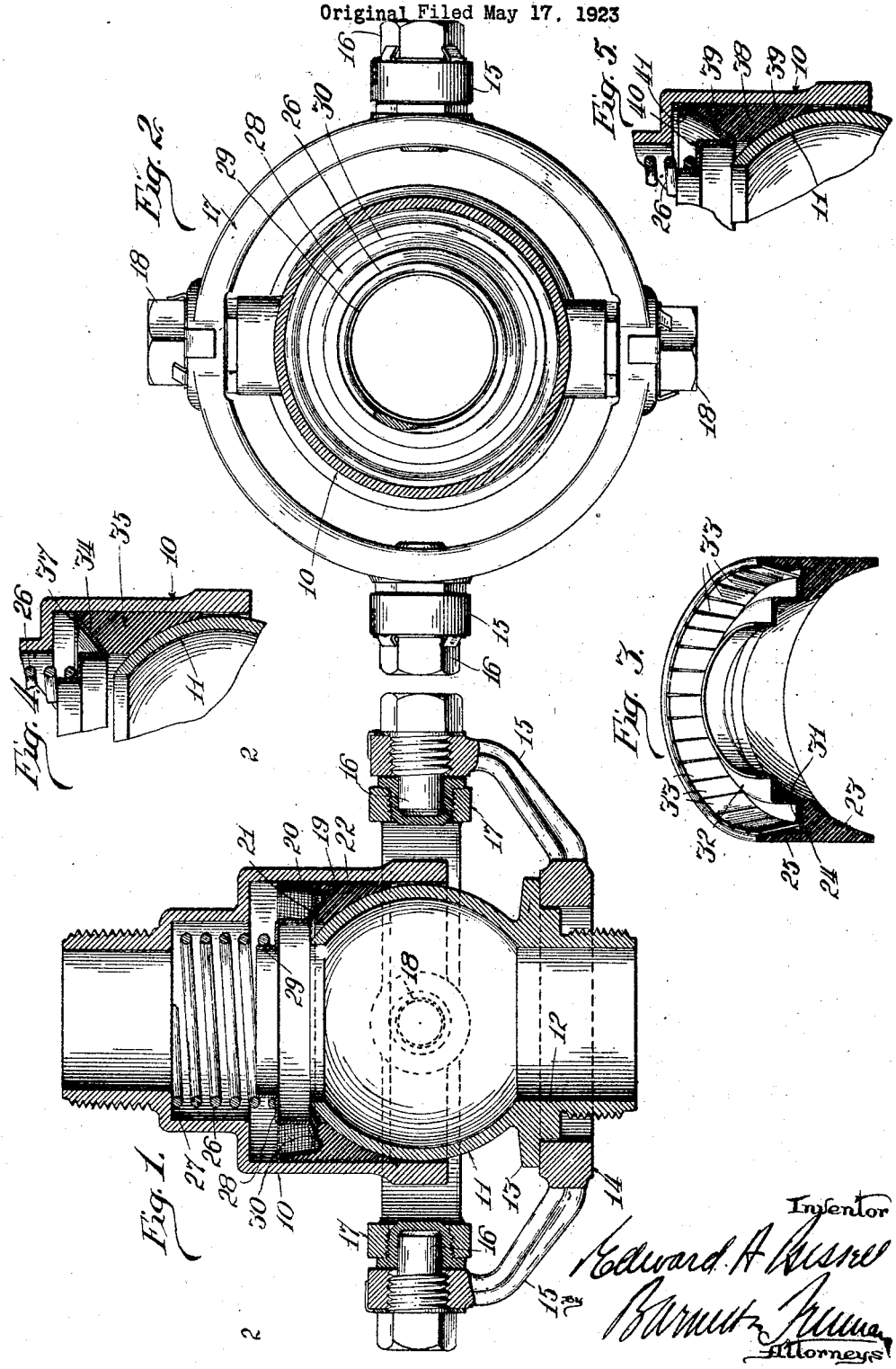
Inventor
Edward A. Russell Patented Mar. 23, 1926.

1,577,760

UNITED STATES PATENT OFFICE.

EDWARD A. RUSSELL, OF CHICAGO, ILLINOIS, ASSIGNOR TO VAPOR CAR HEATING COMPANY, INC., OF CHICAGO, ILLINOIS, A CORPORATION OF NEW YORK.

FLEXIBLE JOINT.

Application filed May 17, 1923, Serial No. 639,495. Renewed August 31, 1925.

*To all whom it may concern:*

Be it known that I, EDWARD A. RUSSELL, a citizen of the United States, residing at Chicago, in the county of Cook and State of Illinois, have invented certain new and useful Improvements in Flexible Joints, of which the following is a specification.

My invention relates to a flexible pipe joint of the type comprising a socket member and a ball member arranged within and spaced slightly from the wall of the socket member, and the object of the invention is to provide an improved gasket or packing ring adapted to be interposed between the socket member and the inner end of the ball member for making the joint fluid tight.

The invention is intended particularly for use as a part of a flexible pipe connection between the steam or air pipes of adjacent cars of a railway train. In this service there are constant vibratory movements between the two members of the joint which tend to wear down the gasket, particularly the surface thereof bearing against the ball. However, the fluid pressure in the joint tends to force the gasket as a wedge, into the space between the ball and socket so that wear is taken up automatically. The fluid pressure also tends to expand the inner end of the gasket against the socket wall.

My present invention seeks to provide a gasket for use in a joint of this type and in the position mentioned which will accomplish its sealing function more satisfactorily and will be more durable than the gaskets heretofore employed in this connection.

A further object of the invention is to provide a novel means for holding the gasket in its sealing contact with the ball and socket members when the joint is not under fluid pressure.

In a gasket of this type employed in the place described the wear on the gasket is upon the surface in contact with the ball member of the joint. With this in view my invention contemplates forming the gasket so that both ends will be alike and each adapted to fit between the ball and socket members of the joint. The gasket when worn on one end may be reversed. The end not in contact with the ball will provide a relatively thin lip for effective sealing relation with the socket member.

The invention is illustrated, in certain preferred embodiments, in the accompanying drawing wherein Fig. 1 is a longitudinal sectional view of the joint.

Fig. 2 is a cross sectional elevation taken on line 2—2 of Fig. 1, looking in the direction of the arrows.

Fig. 3 is a fragmentary sectional perspective view of a modified form of gasket and modified form of follower for the spring which holds the gasket in place in the absence of fluid pressure in the joint.

Fig. 4 is a fragmentary cross sectional view illustrating another improvement of the invention, and Fig. 5 is a similar view illustrating another modification.

Referring first to Figs. 1 and 2, the joint consists of a socket member 10 of tubular configuration and a ball member 11 which projects into the socket member. These parts are flexibly articulated in any suitable manner but preferably so as to hold the ball member slightly out of contact with the inner wall of the socket member. In the joint shown in the drawing the ball member is formed with a neck portion 12 on which is swiveled, against a shoulder 13, a ring 14 provided with arms 15, 15 pivotally connected by pivot studs 16, 16 to a ring 17 which surrounds the outer edge of the socket member. The ring 17 is pivoted to the socket member by a pair of pivot studs 18, 18, the axis of which is at right angles to the axis of studs 16, 16. By this arrangement one member of the joint has limited universal movement with respect to the other member and the freedom of movement as between the parts of the joint is very little affected even when the joint is subject to high internal fluid pressure.

The gasket for sealing or packing the joint consists of a wedge-shaped body part 19, the inner surface of which is curved to correspond with the curvature of the ball member and a relatively thin lip 20 which projects inwardly from the body of the gasket and lies along the surface of the socket member. Preferably the lip is composed of a woven fabric, asbestos, for example, which is secured to the gasket body, for example, when the gasket is molded. The lip is preferably impregnated with the rubber composition. In the gasket shown in Fig. 1 the fabric covers the inner end of the body, as indicated at 21, the outer surface thereof, as indicated at 22, and is looped between these places to form the lip 20.

In the gasket shown in Fig. 3, the fabric covers the top of the gasket body 23, as indicated at 24, and forms the lip 25, or the principal part of the lip, but does not cover the outer surface of the body portion 23.

In any case, the lip is relatively flexible and soft but tough in its texture and will consequently be readily pressed against the interior surface of the socket member by the fluid pressure in the joint.

In order to keep the gasket in proper place in the absence of fluid pressure, a coiled spring 26 is provided (Figs. 1 and 2) adapted to bear at one end against a shoulder 27 formed on the socket member and at the other end against an annular follower 28 formed, preferably, with a flange 29 for centering the spring, and a flange 30 which bears against the inner end of the gasket body.

A modification of the follower ring is shown in Fig. 3. The outer flange 31 of the ring 32 shown in this figure is formed with a plurality of diagonally arranged spring fingers 33 which are arranged to bear and be flexed against the lip 25 of the gasket. Obviously the follower ring shown in Figs. 1 and 3 might be used interchangeably with the gaskets shown in these figures.

In Fig. 4 the upper edge 34 of the gasket 35 is beveled and the follower 36 for spring 26 is formed with an upwardly projecting flange 37 bearing against the surface 34 of the gasket. The resultant wedging action of the spring and follower tends to keep the inner end of the gasket in sealed relation with the wall of the socket member.

In Fig. 5 the opposite ends of the gasket 38 are alike, each being formed with an inner surface 39 having the curvature of the ball member 11 of the joint. When one end of the gasket wears the gasket may be reversed. The inner end of the gasket, that is, the end which is not in contact with the ball, forms a relatively thin lip for effective sealing engagement with the socket member 10 of the joint. In the arrangement shown in this figure the follower 40 for the spring 26 has a curved flange 41 adapted to fit one of the curved surfaces 39 of the gasket and hold this end of the gasket against the wall of the socket.

While I have described my invention in certain preferred embodiments, it will be understood that I contemplate any and all structural modifications within the scope of the annexed claims.

I claim:

1. In a flexible joint, the combination of ball and socket members and a gasket arranged within the space between the inner end of the ball member and the interior surface of the socket member comprising a wedge-shaped body having a curved surface to fit the ball member, and an inwardly projecting lip of thinner and tougher material than the body and arranged to bear against the socket member.

2. In a flexible joint, the combination of ball and socket members, and a gasket arranged within the space between the inner end of the ball member and the interior surface of the socket member comprising a wedge-shaped body of rubber composition having a curved surface to fit the ball member, and an inwardly projecting lip of impregnated woven fabric thinner than the inner end of the gasket body and arranged to bear against the socket member.

3. In a flexible joint, the combination of ball and socket members, and a gasket arranged within the space between the inner end of the ball member and the interior surface of the socket member comprising a wedge-shaped body and a woven fabric covering for the outer surface of said body which extends beyond the body forming a lip which lies against the interior surface of said socket member.

4. In a flexible joint, the combination of ball and socket members and a gasket arranged within the space between the inner end of the ball member and the interior surface of the socket member comprising a wedge-shaped body and a woven fabric covering for the outer surface of said body which extends beyond the body forming a lip which lies against the interior surface of said socket member, said lip being impregnated with a rubber composition.

5. In a flexible joint, the combination of ball and socket members, a gasket arranged within the space between the inner end of the ball member and the interior surface of the socket member comprising a wedge-shaped body having a curved surface to fit the ball member, an inwardly projecting lip thinner and of tougher material than the body and arranged to bear against the socket member, a spring, and a follower interposed between the spring and the inner end of said gasket body within the lip.

6. In a flexible joint, the combination of ball and socket members, a gasket arranged within the space between the inner end of the ball member and the interior surface of the socket member comprising a wedge-shaped body having a curved surface to fit the ball member, an inwardly projecting lip thinner than the end of the body and arranged to bear against the socket member, a spring, and a follower interposed between the spring and the inner end of said gasket body within the lip, said follower being formed with spring fingers which bear against the lip tending to expand the same against the socket member.

7. In a flexible joint, the combination of ball and socket members, a gasket arranged within the space between the inner end of the ball member and the interior surface of the socket member, a spring, and a follower interposed between said spring and gasket which has a resilient part tending to expand the gasket against the socket.

8. In a flexible joint, the combination of ball and socket members, a gasket arranged within the space between the inner end of the ball member and the interior surface of the socket member, an annular member bearing against the inner end face of the gasket and formed with a plurality of spring fingers to bear and be flexed against the interior surface of the gasket, and a spring bearing against said annular member.

9. In a flexible joint, the combination of ball and socket members and a gasket arranged within the space between the inner end of the ball member and the interior surface of the socket member, comprising an annular body having a substantially cylindrical exterior surface to conform to the inner surface of the socket member, and an inner curved surface at one end to fit the ball, the gasket comprising a relatively thin lip portion at the other end adapted to be pressed outwardly against the socket member.

10. In a flexible joint, the combination of ball and socket members and a gasket arranged within the space between the inner end of the ball member and the interior surface of the socket member, comprising an annular body having a substantially cylindrical exterior surface to conform to the inner surface of the socket member, and an inner curved surface at one end to fit the ball, the gasket comprising a relatively thin lip portion at the other end adapted to be pressed outwardly against the socket member, and a follower having a portion adapted to bear outwardly against the lip.

11. In a flexible joint, the combination of ball and socket members and a gasket arranged within the space between the inner end of the ball member and the interior surface of the socket member, comprising an annular body having a substantially cylindrical exterior surface to conform to the inner surface of the socket member, and an inner curved surface at one end to fit the ball, the gasket comprising a relatively thin lip portion at the other end adapted to be pressed outwardly against the socket member, a follower behind the gasket having a portion bearing against the lip, and a spring confined between the follower and a portion of the socket member.

12. In a flexible joint, the combination of ball and socket members, a gasket arranged within the space between the inner end of the ball member and the interior surface of the socket member comprising a wedge-shaped body having a curved surface to fit the ball member at one end and a relatively thin lip portion at its other end, a spring, and an annular follower interposed between said spring and gasket formed with a return bent, diagonally disposed flange to bear against the lip of the gasket.

EDWARD A. RUSSELL.